Patented Aug. 5, 1941

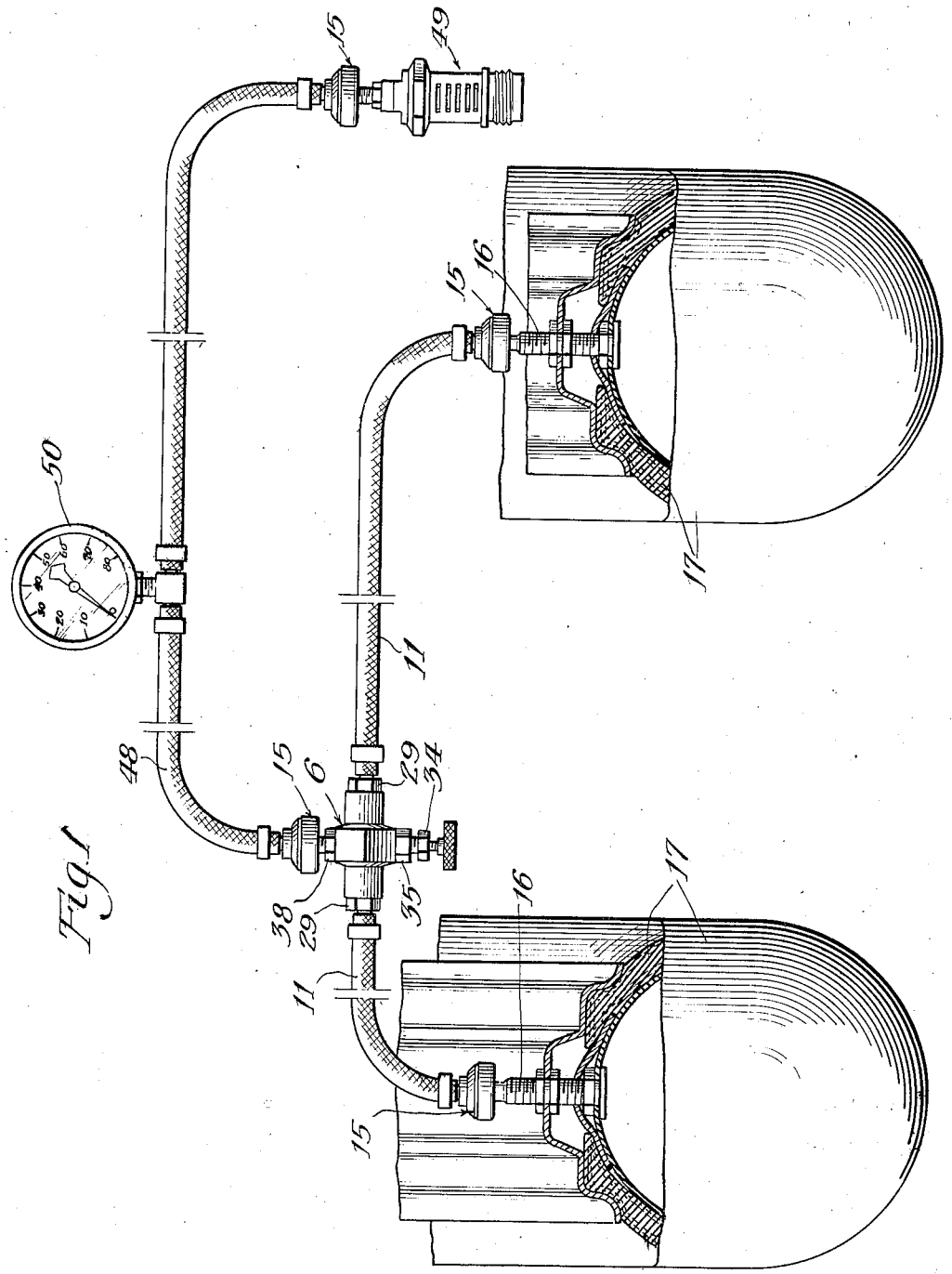

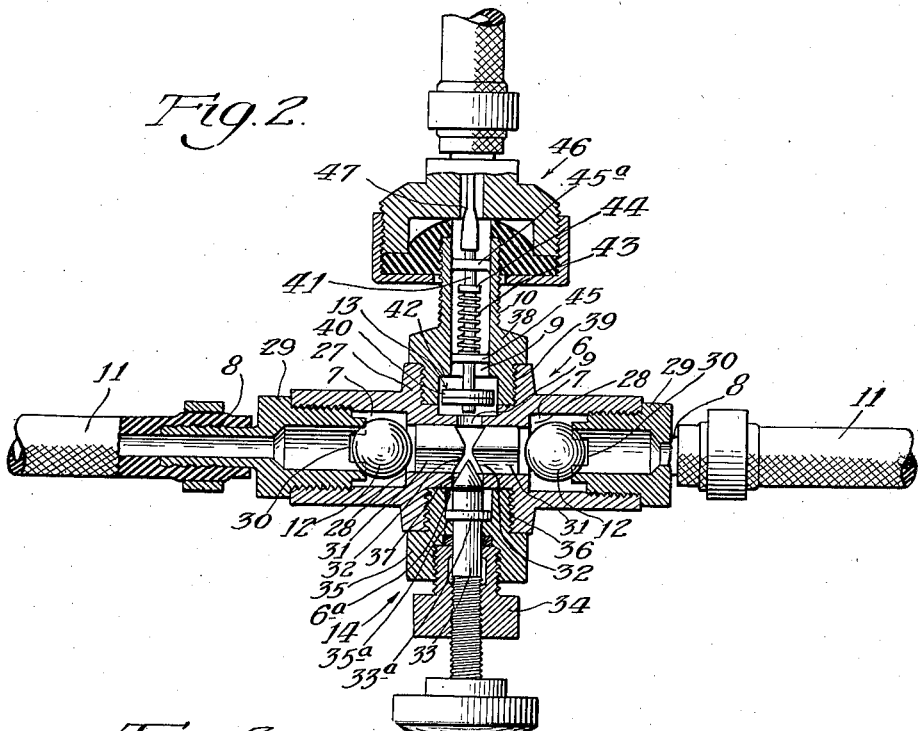

2,251,713

UNITED STATES PATENT OFFICE 2,251,713

TIRE-PRESSURE-EQUALIZER AND INFLATER

George H. Meiser, Chicago, Ill.

Application January 29, 1940, Serial No. 316,283

5 Claims. (Cl. 152—415)

My invention relates to a device by means of which the air pressures in a plurality of pneumatic tires may be equalized and the tires inflated to the same pressure from a source of air pressure.

One phase of the invention has to do with equalization only of the air-pressures in a plurality of tires and another has to do with the inflating, either with or without preliminary equalization, of a plurality of tires to the same air pressure.

One of my objects is to provide a device whereby the air pressures in a plurality of tires at the same side or at opposite sides of a vehicle, or provided as dual tires, may be equalized and remain equalized in the disconnecting of the device from the tires.

Another object is to provide a device by which such a plurality of tires may be inflated to exactly the same pressure from a single source of air pressure and the pressures therein remain equal upon disconnecting the device from the tires.

Another object is to provide for the release of such excess pressure as may be confined in one of such a plurality of tires and the equalization of the pressure in the tires, when the aggregate of the pressures in the tires exceeds that desired when equalized between the tires.

Another object is to permit the operations of inflating the tires and checking the pressures, to be performed quickly and with the least inconvenience to the operator.

Another object is to provide against the building up of too high pressures in the tires and device, whether the source of air pressure is a constant or of a pulsating nature, following the disconnection of the device from one of the tires; and other objects as will be manifest from the following description.

Referring to the accompanying drawings, in which I have shown my invention as embodied in a device for use with two tires only:

Figure 1 is a view in side elevation of the device, with certain parts broken away, showing it as applied to operative position on two tires, the device being illustrated as connected with a source of pulsating air pressure.

Figure 2 is a fragmentary elevational view of the device showing the valve portion thereof in section.

Figure 3 is a side view of the valve portion of the device showing certain parts in section.

Figure 4 is a sectional view of one of the similar chucks forming parts of the device; and Figure 5, a bottom view of the chuck.

The device shown comprises a head 6 having a through passage 7 terminating at its ends in nipples 8 into which a transverse passage 9 terminating in a nipple 10, opens; flexible hose lines 11 connected at one end with the nipples 8, respectively, and adapted for connection at their outer ends with the valve tubes of a pair of pneumatic tires; check-valves 12 in the passage 7 at opposite sides of the passage 9; a self-closing valve device 13 in the passage 9; and means represented generally at 14 for controlling the unseating of the check valves 12.

The outer ends of the hose lines 11 are provided with chucks 15 adapted to be forced over the valve tubes, such as commonly provided, of the tires in connection with which the device is to be used, and open the valves in the tubes and make air-tight joints therewith; these chucks being illustrated in Fig. 1 as applied to position on the valve tubes 16 of two pneumatic tires represented at 17.

Each of the chucks shown comprise a head 18 having a nipple portion 19 to which the one of the hose lines 11 associated therewith is connected, each head 18 having a passage 20 extending entirely therethrough and through the nipple 19, the outer face of each head having a circular recess 21. Each chuck further comprises a gasket 22 of rubber or other suitable resilient material, extending over the outer face of the head and into the recess 21, a cap 23 screwed upon the head 18 and clamping the gasket 22 and the head 18 tightly together, the gasket and cap having registering openings 24 and 25, respectively, in line with the passage 20 in the head; and a pin 26 extending non-conformingly into the passage 20 so as not to close this passage, and extending into such position in the opening 24 in the gasket, as shown, as to cause it to engage, unseat, and hold open, the valve proper of the tire upon applying the chuck to position on the valve tube.

The pin 26 may be secured to the head 18 in any desirable way, in the construction shown its inner end, where it extends into the passage 20, being flanged to such width as to require it to be driven into the head 18.

The head 6 is shown as formed of a central hollow section 27 presenting annular valve seats 28, into the socketed ends of which in line with the seats 28, plugs 29 carrying the nipples 8, are screwed, the inner ends of these plugs being notched at intervals as represented at 30.

Interposed between the valve seats 28 and the notched portions 30 of the plugs 29 are the check valves 12 which are movable into and out of engagement with the seats 28 and said notched portions, the check-valves seating against the seats 28 and closing the passage 7 by the pressure from the tires when the device is applied to use and the check-valves are unrestrained.

The means 14 for controlling the seating of the check valves 12 comprise similar alining plunger pins 31 located in the portion of the passage 7 between the seats 28 and non-conforming in cross section to the cross sectional shape of this passage to permit of the passage of air therethrough, the inner ends of these pins being beveled as shown at 32.

These means also comprise a spreader element 33 cooperating with the pins 31 and shown as formed of a rod threaded at its outer end in a gland 34 screwed into a plug 35 in turn screwed into a threaded socket 36 in the head section 27 between the ball seats 28, the inner end of the rod 33 being of conical shape as represented at 37 to adapt it to enter between the beveled ends of the pins 32 and when screwed inwardly from the position shown in Fig. 2 forcing these pins away from each other and against the check valves 12 to force the latter away from the seats 28.

A collar 33a on the rod 33 cooperates with the surface 6a and a shoulder 35a on the plug 35 to limit inward movement of the rod to prevent injury to the parts and outward movement thereof, respectively.

The nipple 10, which is directly opposite the rod 33, is carried by a plug 38 which is screwed into a socket 39 in the head section 27 and is equipped with the self-closing valve device 13, such as is commonly provided in pneumatic tires, the valve proper of which represented at 40 is carried by a stem 41 normally forced to a position in which the valve proper engages an annular seat 42 in the plug, by a spring 43 confined between a stop collar 44 on the stem and cross bars 45 and 45a in the plug 38 in which the stem 41 is slidable.

The device may be used with any suitable source of compressed air, such as for example one which supplies air pressure at a constant pressure as in the case of the usual service stations, or one which supplies air pressure by a pulsating action as in the case of the use of one of the cylinders of an automobile engine as the means for pumping air, by normally operating the other cylinders of the engine.

In both of these cases the air is delivered to the inlet passage 9 of the device through a hose usually, and preferably, provided with a pin-equipped chuck such as for example as shown at 46 and of the same construction as the chucks 15, the pin of the chuck 46 and corresponding with the pin 26, being represented at 47 and operating, by engaging the stem 41, to open the valve 13 upon applying the chuck to the nipple 10.

In the drawings I have shown my device as associated with a source of compressed air supply of a pulsating nature, the chuck 46 being shown as carried on one end of a hose 48 connected at its opposite end with an air-intake-and-outlet valve device, such as is in common use, for insertion into the spark-plug-receiving opening of one of the cylinders of an automobile engine from which the spark plug has been removed, the engine in operating on its other cylinders, pumping air by a pulsating action, under the control of the valve device 13 through the hose 48 to the passage 9 in the head 6. As is usual in this type of pumping device a pressure gage represented at 50 is connected with the hose 48 between its ends, which on the suction stroke of the pumping cylinder of the engine, indicates the air pressure which is built up in my device and in the tires connected therewith.

For a purpose hereinafter described the effective cross-sectional area of the passage at the valve inlet 9 through which the air passes from the air-inflating hose 48, should not be greater than the effective cross-sectional area of the passage through the smallest one of the valve tubes on the plurality of tires to be simultaneously inflated.

In utilizing my device for equalization only of the air pressure in a pair of tires, the operator connects the hose lines 11 at their chucks 15 with the valve tubes 16 of the tires, the spreader rod 33 having been preliminarily screwed outward to the inoperating position shown in Fig. 2, the check-valves 12 becoming seated against the seats 28 by the pressures in the tires. The spreader rod 33 is then screwed inwardly to spread the pins 31 apart and unseat the check-valves, thereby affording a continuous course between the two tires through which equalization of the pressures in the tires is effected. Before the device is disconnected from the valve tubes of the tires the operator screws the spreader rod 33 outwardly to permit the check-valves 12 to engage the seats 28 and close the course at these two points.

By reason of the provision of the check valves 12 which close as above stated before disconnecting the device from the valve tubes of the tires, the disconnecting of the hose lines 11 from the valve tubes may be effected in succession (an unavoidable procedure especially where a single operator is conditioning tires at opposite sides of an automobile) and without escape of pressure from either of the equalized tires.

In utilizing the device for equalizing the pressures in two tires where the aggregate of the pressures in the tires is greater than that desired the procedure would be the same as that above described for equalizing the pressures, except that during the time the spreader rod 33 is in check-valve-unseating position, the operator manually forces the valve 13 inwardly to vent the excess pressure, the pressure in the tires being checked by the use of my suitable gauge device momentarily applied by the operator to the nipple 10.

In utilizing the device for the inflation of two tires to produce therein the same desired pressure, the operator may or may not, as conditions render it advisable, equalize the pressure in the two tires before starting inflation. In those cases where such preliminary equalization is desired the device would be applied to the tires, with the spreader rod 33 in inoperating position as above explained, and the rod 33 then operated to force the check-valves 12 to open position, effecting equalization of pressure in the tires. Compressed air would then be supplied to the tires through the inflation hose, inflating them to the same pressure. Where the source of compressed air is of a pulsating nature as in the means shown, the gauge between pulsations serves to indicate, upon unseating the valves 12 by moving the spreader rod 33 inwardly, the built-up pressure in the tires. Where the tires are inflated by the usual service station equipment unprovided with pressure indicating means, the pressure in the tires may be checked by disconnecting the inflating hose from the valved inlet 9, unseating the check valves 12 by means of the spreader rod 33, and applying to the nipple 10 any suitable pressure-indicating means so constructed as to open the valve 13.

In those cases where preliminary equalization of the pressure in the two tires is not desired, as for example in the case of puncture of one of the tires, especially in the case of dual tires, the spreader-rod 33 remains at all times in outwardly screwed position, and upon opening the valved inlet 9 to the inflating pressure, the one of the check-valves 12 which cooperates with the tire containing the greater pressure remains closed, until the pressure in the other tire is raised to that of the first mentioned tire whereupon the pressure supplied to the device divides, simultaneously building up the pressure in both tires equally to the desired pressure.

In the event of either of the hose lines 11 being disconnected from its cooperating valve stem before the other thereof in disconnecting the device from the tires, the inflating pressure will vent through the disconnected hose line, the one of the check-valves 12 cooperating with the other hose line automatically closing to hold the built up pressure in the tire connected with this hose line. As the air-valve of the tire first disconnected from the device automatically closes immediately upon such disconnection and as the pressure in the other tire cannot escape (the air-valve of this last-referred-to tire automatically closing upon disconnecting therefrom the one of the hose lines 11 connected therewith) the two tires retain the equal pressures built-up therein as above explained.

The venting of the inflating pressure from the inflating hose line as stated affords a safety feature inasmuch as it is impossible, during the interval of time elapsing between the disconnecting in succession of the hose lines 11 from the valve tubes of the tires, to build up pressures which would disturb equalization of the pressure in the tires or damage any part of the apparatus as for example the gauge in a pulsating source of compressed-air supply, such as the gauge 50, or the hoses leading from the source of compressed air to the valve tubes of the tires, where the compressed air is very highly compressed as sometimes occurs at ordinary service stations.

While I have illustrated and described a certain particular equipment embodying my invention I do not wish to be understood as intending to limit it thereto as the same may be variously modified and altered and the invention embodied in other forms of structure without departing from the spirit of my invention. Thus, by way of examples, the fitting on the hose 48 for connection with the valved inlet 9 of the device need not be of the construction shown nor provide for automatic opening of the valve 13, nor, except where equalization of pressures in the two tires is to be simply effected by opening one to the other thereof, need the fittings on the hose lines 11 be of the construction shown nor provided with means for automatically opening the valves of the tires upon application thereto.

Furthermore, the invention is not limited to use on two tires simultaneously as it may be utilized for the equalization of the pressure in more than two tires and also simultaneous inflation of more than two tires to the same pressure, as for example by providing an additional lead from the controlling devices in the head for each additional tire to be serviced, with a check valve 12 and controlling pin 31 for each additional lead. Manifestly, if desired, two of the devices shown for servicing more than two tires simultaneously, and connected with a common source of compressed air may be provided.

What I claim as new and desire to secure by Letters Patent, is:

1. A tire-pressure-equalizer device comprising a tubular member for application to the tire valves of a plurality of tires of different pressures, outwardly closing check valves in said member normally checking the escape of pressure from the tires, and controllable means for unseating said check valves in opposition to the pressure in the tires and holding them open.

2. A tire-pressure-equalizer device comprising a tubular member for application to the tire valves of a plurality of tires of different pressures, outwardly closing check valves in said member normally checking the escape of pressure from the tires and a single controllable means for unseating said check valves in opposition to the pressure in the tires and holding them open.

3. A device by which a plurality of tires may be inflated to the same pressure comprising a tubular member for application to the tire valves of a plurality of tires, said member having a through air passage and a branch air passage, said branch air passage for connection with a source of compressed air, check valves in said through passage at opposite sides of said branch air passage automatically closing when the pressure in the tires exceeds the pressure in said branch air passage, and controllable means for opening said check valves in opposition to the pressure in the tires to equalize the pressure in the tires and holding them open.

4. A device by which a plurality of tires may be inflated to the same pressure comprising a tubular member for application to the tire valves of a plurality of tires, said member having a through air passage and a branch air passage for connection with a source of compressed air, a valve in said branch air passage, normally closed check valves in said through passage at opposite sides of said branch air passage automatically closing when the pressure in the tires exceeds the pressure in said branch air passage, and controllable means for opening said check valves in opposition to the pressure in the tires and holding them open.

5. A device by which a plurality of tires may be inflated to the same pressure comprising a tubular member for application to the tire valves of a plurality of tires, said member having a through air passage and a branch air passage, said branch air passage for connection with a source of compressed air, check valves in said through passage at opposite sides of said branch air passage, and means adapted when actuated to unseat said check valves and hold them open and comprising pins slidable in said member into and out of a position and by means of which said check valves are unseated and a member movable for actuating said pins to unseat said check valves.

GEORGE H. MEISER.